United States Patent
Hoppe

Patent Number: 6,075,540
Date of Patent: Jun. 13, 2000

[54] STORAGE OF APPEARANCE ATTRIBUTES IN ASSOCIATION WITH WEDGES IN A MESH DATA MODEL FOR COMPUTER GRAPHICS

[75] Inventor: Hugues H. Hoppe, Seattle, Wash.

[73] Assignee: Microsoft Corporation, Redmond, Wash.

[21] Appl. No.: 09/035,651

[22] Filed: Mar. 5, 1998

[51] Int. Cl.[7] .................................................. G06T 17/00
[52] U.S. Cl. .......................................... 345/419; 345/423
[58] Field of Search ...................................... 345/419, 423

[56] References Cited

PUBLICATIONS

"Object Files," section B1, pp. 1–46 (prior to Mar. 5, 1998).
Wernecke, "Programming Object–Oriented 3D Graphics with Open Inventor, Release 2," *The Inventor Mentor* chapter 5, pp. 126–132 (1994).
"3D Graphics Programming with QuickDraw 3D," chapter 4, pp.3–23, (1995).
Schmalstieg and Schaufler, "Smooth Levels of Detail," (1997).
Hoppe, "Progressive Meshes," *Computer Graphics* (SigGRAPH 96 Proceedings) (1996).

*Primary Examiner*—Mark R. Powell
*Assistant Examiner*—Lance W. Sealey
*Attorney, Agent, or Firm*—Klarquist Sparkman Campbell Leigh & Whinston, LLP

[57] ABSTRACT

A mesh data model efficiently represents the appearance of the modeled object by storing scalar appearance attributes, such as may be used as parameters of a shading function applied to faces of a mesh, in association with wedges. The wedges are sets of contiguous vertex-adjacent corners having identical scalar appearance attributes. The mesh data model thus stores the scalar appearance attributes once for each wedge, rather than per corner of the mesh. The mesh data model can be structured as arrays of face, wedge and vertex records, where each face record contains references to the wedge records of the wedges in which the face's corners belong. The mesh data model can be used in a progressive mesh representation.

22 Claims, 13 Drawing Sheets

FIG. 3

```
struct VertexAttrib {              // Attributes at a vertex
        Point point;               // (x, y, z) coordinates
};

struct WedgeAttrib {               // Attributes at a wedge/corner
        Vector normal;             // (nx, ny, nz) normal vector
        UV uv;                     // (u, v) texture coordinates
};

struct Vertex {
        VertexAttrib attrib;
};

struct Wedge {
        int vertex;                // vertex to which wedge belongs
        WedgeAttrib attrib;
};

struct Face {
        int wedges[3];             // wedges at corners of the face
        int fnei[3];               // 3 face neighbors
        short matid;               // material identifier
};

struct Mesh {
        Array<Vertex> vertices;
        Array<Wedge> wedges;
        Array<Face> faces;
        Array<Material> materials;
};
```

FIG. 4

```
struct PMesh {
        Mesh base_mesh;            // base mesh M⁰
        Array<Vsplit> vsplits;     // {vsplit₀, ..., vsplit_{n-1}}
        int full_nvertices;        // number of vertices in Mⁿ
        int full_nwedges;          // number of wedges in Mⁿ
        int full_faces;            // number of faces in Mⁿ
};
```

FIG. 5

```
struct VertexAttribD {          // Delta applied to vertex attributes
    Vector dpoint;              // ΔVertexAttrib.point
};

struct WedgeAttribD {           // Delta applied to wedge attributes
    Vector dnormal;             // ΔWedgeAttrib.normal
    UV duv;                     // ΔWedgeAttrib.uv
};

struct Vsplit {
    int flclw;                  // a face in neighborhood of vsplit
    short vlr_rot;              // encoding of vertex v_r
    struct {
        short vs_index: 2;      // index (0..2) of v_s within flclw
        short corners: 10;      // corner continuities of Fig. 6
        short ii: 2;            // geometry prediction of Fig. 7
        short matid_predict: 2; // are fl_matid, fr_matid required?
    } code;                     // set of 4 bit-fields (16 bits total)
    short fl_matid;             // matid of face fl if not predicted
    short fr_matid;             // matid of face fr if not predicted
    VertexAttribD vad_l, vad_s;
    Array<WedgeAttribD> wads;
};
```

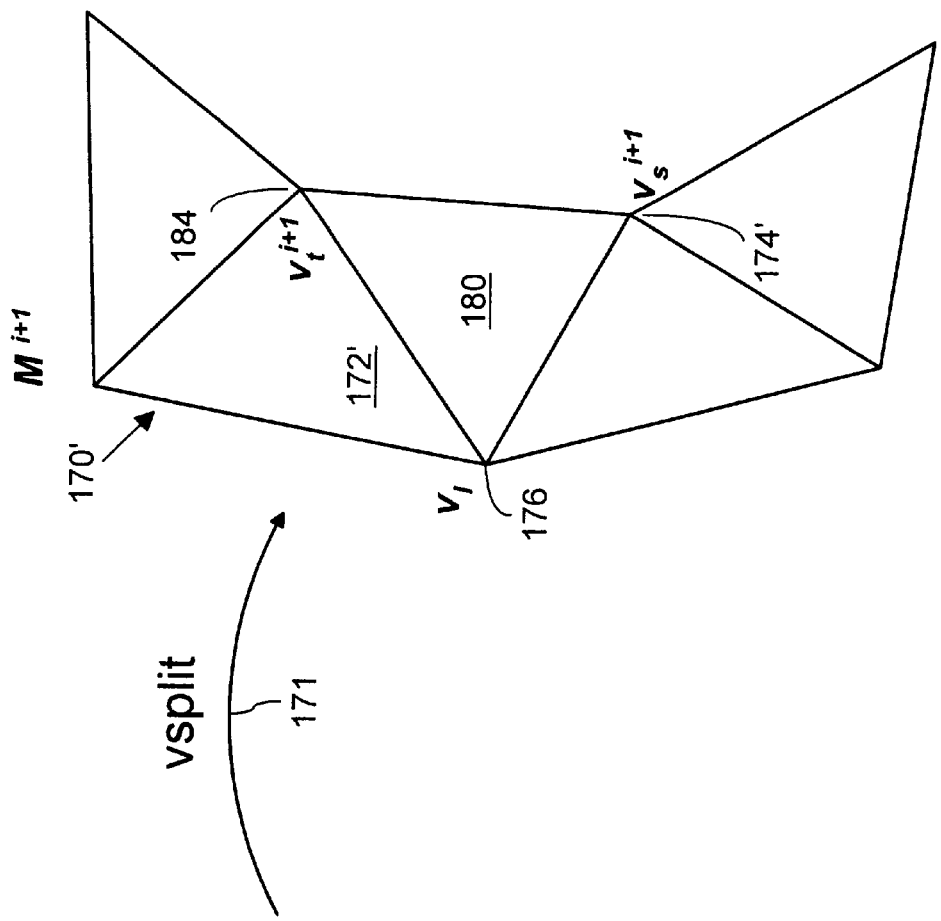
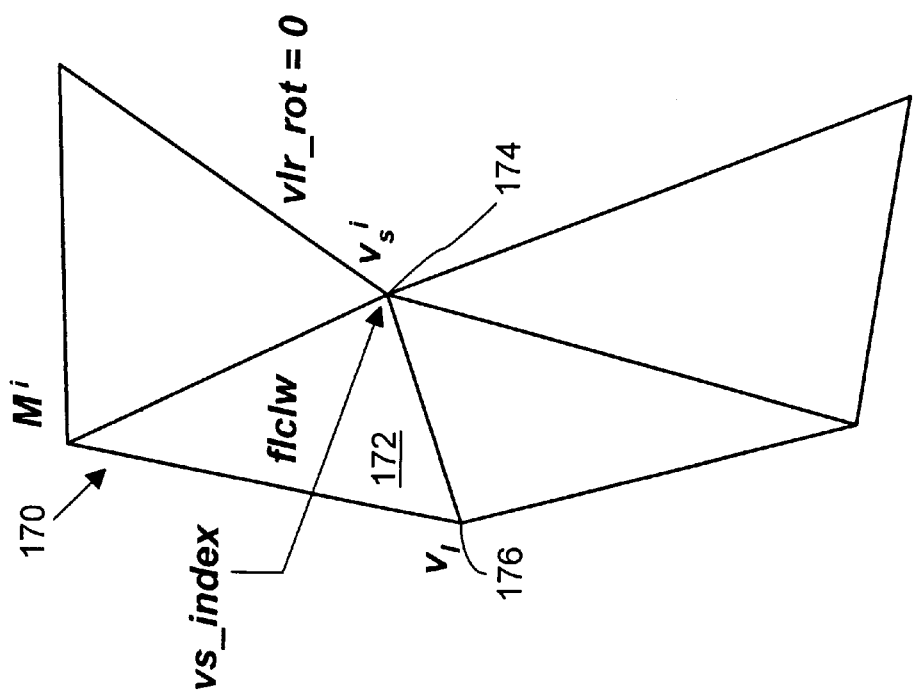
FIG. 7

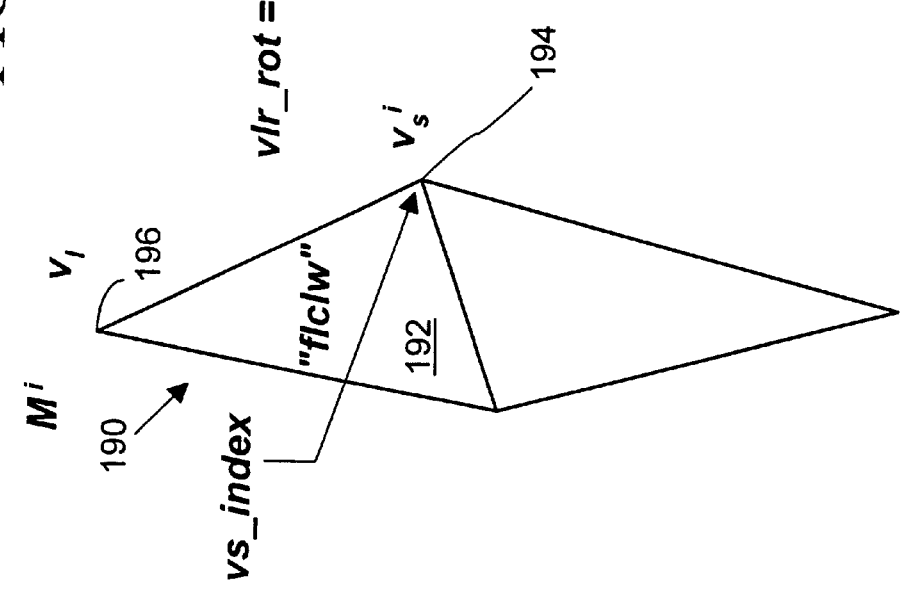
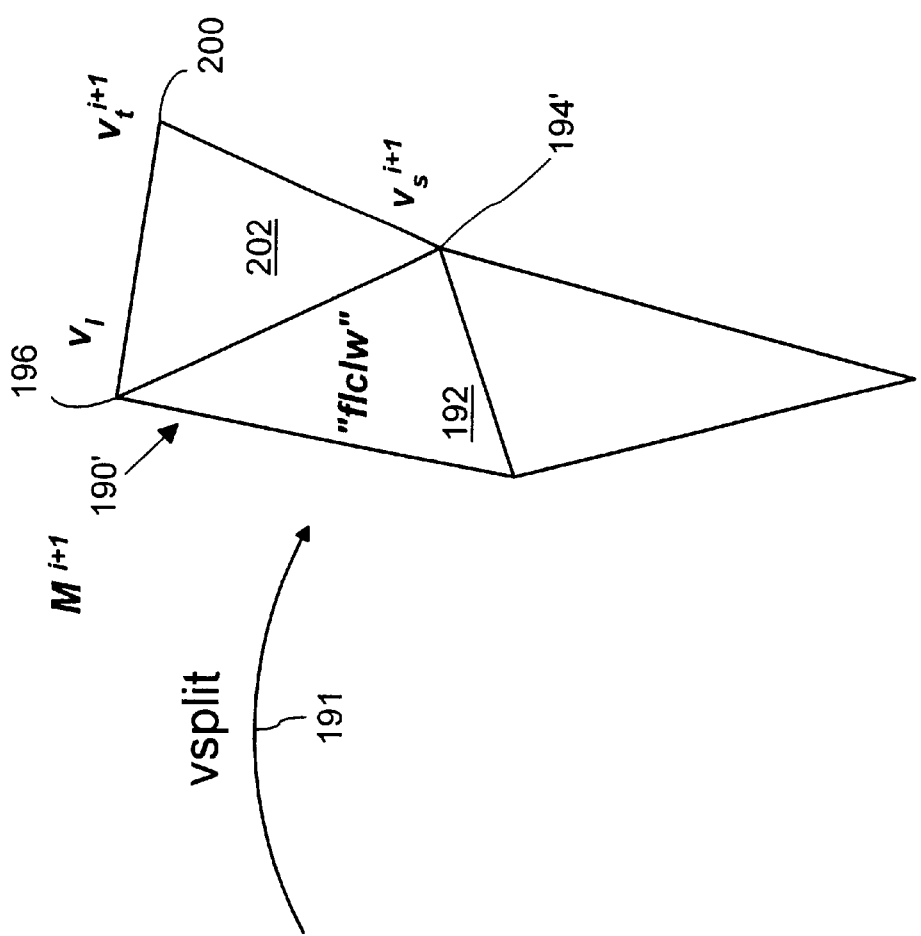
FIG. 8

FIG. 11

```
struct PMeshRStream {          // read from either PMesh or istream
    PMesh* pm;                 // may be 0
    istream* istr;             // may be 0
    int vspliti;               // if pm ≠ 0, index into pm->vsplits
    Vsplit vspl;               // if pm = 0, temporary buffer
};
```

FIG. 12

```
struct PMeshIter : public Mesh {
    PMeshRStream& pmrs;
    PMeshIter( PMeshRStream& );
    PMeshIter( PMeshIter& );
    int next();                // apply one vertex split
    int prev();                // apply one edge collapse
    enum Type { WANT_NVERTICES, WANT_NFACES };
    int goto( Type, int );     // go to specified # of vertices/faces
    int nextA( Ancestry*);     // for use with geomorphs
};
```

FIG. 13 struct Geomorph : public Mesh {
    Array<VertexAttrib> *vattribs*[2];
    Array<WedgeAttrib> *wattribs*[2];
    enum Type { WANT_NVERTICES, WANT_NFACES };
    Geomorph( PMeshIter&, Type, int );
    void evaluate( float );        // takes parameter $0 \leq \alpha \leq 1$
};

FIG. 14 struct Ancestry {
    Array<VertexAttrib> *anc_vattribs*;
    Array<WedgeAttrib> *anc_wattribs*;
};

START
↓
261 — CONSTRUCT VERTEX SPLIT DEPENDENCY GRAPH
↓
262 — CONSTRUCT SORTED CANDIDATE LIST FROM ALL NON-DEPENDENT VERTEX SPLITS IN DEPENDENCY GRAPH
↓
263 — FOR X=1..N ←
↓
264 — SELECT VERTEX SPLIT IN CANDIDATE LIST WITH NEXT HIGHER FACE INDEX
↓
265 — ENCODE FACE INDEX DELTA IN SELECTED VERTEX SPLIT
↓
266 — ADD SELECTED VERTEX SPLIT TO SEQUENCE AT X
↓
267 — REMOVE DEPENDENCIES ON SELECTED VERTEX SPLIT FROM DEPENDENCY GRAPH
↓
268 — UPDATE CANDIDATE LIST WITH NEW NON-DEPENDENT VERTEX SPLITS FROM DEPENDENCY GRAPH
↓
269 — NEXT X  → X=X+1
↓ X=N
END

STORAGE OF APPEARANCE ATTRIBUTES IN ASSOCIATION WITH WEDGES IN A MESH DATA MODEL FOR COMPUTER GRAPHICS

FIELD OF THE INVENTION

The present invention relates generally to geometric modeling using polygonal meshes for computer graphics, and more particularly relates to techniques for efficiently storing and displaying such mesh data models.

BACKGROUND AND SUMMARY OF THE INVENTION

Computer graphics, such as in computer generated images, animations and effects for motion pictures, television, computer multi-media, computer games, print and other media, often employ detailed geometric models for rendering images of three-dimensional objects. These models are typically created using commercially available computer-aided modeling and 3D scanning systems. Although some geometric models may be initially defined using high level primitives, for efficient rendering they are typically converted to their lowest common denominator form, polygonal approximations called meshes.

In the simplest case, a mesh consists of a set of vertices and a set of faces. Each vertex specifies the (x, y, z) coordinates of a point in space, and each face defines a polygon by connecting together an ordered subset of the vertices. These conjoined polygons approximate the surface geometry of the modeled object. The polygons may in general have arbitrary numbers of vertices (and even holes). For convenience, the special case of a mesh (called a "triangle mesh") in which all faces have exactly three vertices is commonly used. Arbitrary meshes composed of polygons having faces with any number of vertices equal to or greater than three can be easily converted to triangle meshes through known triangulation processes.

Complex (i.e., highly detailed) triangle meshes are notoriously difficult to render, store, and transmit. One approach to speed up rendering is to replace a complex mesh by a set of level-of-detail (LOD) approximations. A detailed mesh is used when the object is close to the viewer, and coarser approximations are substituted as the object recedes from the viewer in the image. These LOD approximations can be precomputed automatically using known mesh simplification methods. Additionally, compression schemes have been developed for efficient storage and transmission of meshes.

In my earlier U.S. patent application Ser. No. 08/586,953 entitled, "Encoding and Progressive Transmission of Progressive Meshes," filed Jan. 11, 1996 (the disclosure of which is incorporated herein by reference; hereafter referred to as the "Progressive Meshes Patent Application"), I (the inventor) disclosed the progressive mesh (PM) representation which provides a unified solution to the problems of efficiently storing, transmitting and rendering a mesh of arbitrary complexity. In short, the PM representation of an arbitrary mesh $\underline{M}$ is stored as a coarse or base mesh $M^0$ together with a sequence of n refinement records that indicate how to incrementally refine $M^0$ back up to the arbitrary mesh $\underline{M}$. Each refinement record encodes information associated with a vertex split transformation that transforms the mesh by splitting a vertex $v_s$ (that is positioned between side vertices $v_l$ and $v_r$) to add one vertex $v_t$ and up to two faces ($f_l=\{v_s, v_t, v_l\}$ and $f_r=\{v_s, v_t, v_r\}$) to the mesh. The PM representation thus defines a continuous sequence of LOD approximations to the arbitrary mesh that are produced by applying the vertex split transformation defined by successive refinement records successively to the base mesh $M^0$, resulting in a sequence of progressively more detailed meshes $M^0 \ldots M^n$, $M^n=\underline{M}$. The PM representation also supports smooth visual transitions, called geomorphs, between any two of these approximations, as well as allowing progressive transmission and efficient compression of the sequence of LOD approximations of the arbitrary mesh.

For realistic rendering of an object, meshes in computer graphics (including the continuous sequence of LOD meshes defined by the PM representation) often have numerous other appearance attributes in addition to its geometric properties (i.e., vertex positions and connectivity of vertices and polygons). These additional appearance attributes can be classified into two types, discrete attributes and scalar attributes.

The discrete attributes are usually associated with faces of the mesh. A common discrete attribute, the material identifier, determines the shader function used in rendering each face of the mesh. For instance, a trivial shader function may involve a straight-forward look-up in a specified texture bitmap.

Many scalar attributes usually also are associated with a mesh. In general, the scalar attributes specify local parameters of the shader functions defined on the mesh faces. Typical examples include texture coordinates and normals which in simple cases are associated with vertices of the mesh. In the case of a simple shader function that projects a bitmap on a face of the mesh for example (e.g., the texture bitmap specified by the discrete attribute associated with the face), texture coordinates that are represented as value pairs (u,v) and associated with the vertices of the face indicate locations in the text bitmap that project onto the respective vertices. Normals which indicate a direction perpendicular to the face at the vertex, such as with a value set ($n_x$, $n_y$, $n_z$) may be used for more complex shading and/or lighting effects.

There are problems, however, with storing the scalar attributes in association with vertices. In particular, it is desirable to be able to represent discontinuities in the scalar field, such as where adjacent faces of the mesh have different shading functions. For example, a mesh that models a terrain may use different texture bitmaps for areas of grass, dirt, and water. Faces of the mesh that adjoin a boundary between these areas thus would typically require different texture coordinates for indexing the different texture bitmaps at their shared vertices lying on the boundary.

One solution to the problem of representing scalar field discontinuities is to associate scalar attributes with corners of the mesh, and not simply vertices. A corner is a point on a face of the mesh at one of the face's vertices, and can be defined as a (vertex, face) value set or tuple. Scalar attributes at a corner (v, f) specify the shading parameters for face f at vertex v. For example, along a crease in the mesh (a curve on the surface across which the normal field is not continuous), each vertex has two distinct normals, one associated with the corners on each side of the crease. This is the approach taken in the PM representation disclosed in above-referenced patent application.

A drawback to this approach is that explicitly storing scalar attributes associated with each corner of the mesh consumes significant amounts of data storage capacity. Typically, a mesh with n vertices will have approximately 2n faces, and consequently approximately 6n corners. However, in general, many corners that are adjacent to a same vertex share the same scalar attributes. Thus, many of the scalar attributes associated with the corners are duplicates.

Another approach that both allows scalar field discontinuities to be represented and reduces scalar attribute storage is to store scalar attributes in association with vertices, but replicate vertices along discontinuity curves so that different scalar attributes can be stored with separate vertices at a same spatial position. This effectively separates the mesh along the discontinuity curves because faces that would otherwise adjoin from opposite sides of the curve no longer connect at a same pair of vertices. The faces instead connect to separate replicated vertices that share a common position.

Although satisfactory for static meshes, the vertex replication approach has drawbacks when applied to the PM representation and like meshes that undergo dynamic or run-time transformations. When localized modifications are made to the mesh structure (such as when a vertex split transformation is applied to one of replicated vertices at a same position), the replicated vertices can be pulled apart. This effectively introduces gaps or cracks in the mesh surface. For this reason, the vertex replication approach generally is antithetical to runtime LOD variation and progressive transmission.

The present invention provides a mesh representation for more efficient storage of scalar attributes while avoiding the tearing problem of the vertex replication approach. In accordance with one aspect of the invention, scalar attributes are stored in the mesh representation in association with wedges. A wedge is a set of contiguous, vertex-adjacent corners whose attributes are identical. This approach stores scalar attributes more efficiently than per corner storage since duplicative storage of identical scalar attributes associated with adjacent corners is avoided.

In accordance with a further aspect of the invention, the mesh representation contains a collection of vertices, a collection of wedges, and a collection of faces, where each face contains references to wedges and each wedge contains a reference to a vertex. In other words, the structure of the mesh representation is singly linked in the direction of faces to wedges to vertices. Each face also contains discrete attributes associated with the face, such as a material identifier that indicates a material color or texture mapping parameters. Each wedge contains scalar attributes associated with the wedge, such as surface normals and texture coordinates.

According to another aspect of the invention, a progressive mesh representation (herein referred to as the "efficient PM representation") contains a base mesh having the above described singly linked structure and vertex split records that identify the vertices in the vertex split transformation (i.e., the vertices denoted as ($v_s$, $v_l$, $v_r$) in the above incorporated Progressive Meshes Patent Application) relative to a face of the mesh. Identifying the vertices relative to a face facilitates application of the transformation to the mesh structure that can only be traversed in the direction of faces to wedges to vertices. In the illustrated efficient PM representation for example, the split vertex ($v_s$) is identified by an index of the vertex in an ordered list of vertices of the specified face. A first side vertex ($v_l$) of the transformation is identified as a next of the specified face's vertices in a clockwise direction. The other side vertex ($v_r$) of the transformation is identified by a number of clockwise face rotations about the split vertex from the first side vertex.

According to an additional aspect of the invention, wedges introduced by a vertex split transformation are encoded in a vertex split record as a set of Boolean flags (referred to herein as "corner continuities") that indicate whether each corner of the two faces introduced by the transformation have scalar attributes that are identical to or differ from its adjoining corners.

According to yet another aspect of the invention, a face of the mesh is specified in a vertex split record of the efficient PM representation as a difference from a face of an immediately preceding vertex split record. Further, the vertex split records are reordered in the efficient PM representation so as to minimize the difference of a vertex split record's face from that of the preceding vertex split record.

According to yet an additional aspect of the invention, the vertex split records of the efficient PM representation encode corner continuities, a geometry or position of the split vertex, and discrete attributes of the new faces in the vertex split transformation (e.g., material identifier) using predictive encoding. Further, a single arithmetic encoding table is used to represent the predictions of the corner continuities, split vertex geometry and new faces' discrete attributes. In general, the predictions of these values are highly correlated such that the encoding with the single arithmetic encoding table results in efficient storage of the vertex split records.

Additional features and advantages of the invention will be made apparent from the following detailed description of an illustrated embodiment which proceeds with reference to the accompanying drawings.

BRIEF DESCRIPTION OF THE DRAWINGS

FIG. 3 is a program listing of data structures of a mesh in which scalar attributes are stored in association with wedges.

FIG. 4 is a program listing of a data structure of a progressive mesh representation using the mesh data structure of FIG. 8.

FIG. 5 is a program listing of a data structure of a vertex split transformation for use in the progressive mesh representation of FIG. 9.

FIG. 7 is a block diagram illustrating a vertex split transformation represented in a vertex split record as a face identifier, split vertex index, and rotation in a special case where a second side vertex is missing from the mesh.

FIG. 8 is a block diagram illustrating a vertex split transformation represented in a vertex split record as a face identifier, split vertex index, and rotation in a special case where a face on which a side vertex is clockwise from a split vertex is missing from the mesh.

FIG. 11 is a program listing of a progressive mesh read stream for traversing the progressive mesh representation of FIG. 9.

FIG. 12 is a program listing of a progressive mesh iterator for traversing the progressive mesh representation of FIG. 9 using the progressive mesh read stream of FIG. 11.

FIG. 13 is a data structure of a geomorph using the progressive mesh representation of FIG. 9 and progressive mesh iterator of FIG. 12.

FIG. 14 is a data structure of ancestral attributes of vertices and wedges in the geomorph of FIG. 13.

FIG. 15 is a flow diagram of a process for reordering vertex split records in the progressive mesh representation of FIG. 4 for minimal delta encoding of face identifiers in the vertex split transformation data structures of FIG. 5.

DETAILED DESCRIPTION OF THE ILLUSTRATED EMBODIMENTS

The present invention is directed toward a method and system for an efficient mesh representation that stores appearance attributes in association with wedges. In one embodiment illustrated herein, the invention is incorporated into a three dimensional computer graphics rendering system, entitled "Microsoft Direct X 5" and associated developer's kits (more particularly, in components entitled "DirectDraw" and "Direct 3D"), marketed by Microsoft Corporation of Redmond, Wash. Briefly described, this software is a low-level, device independent application programming interface to display devices for invoking graphics services.

Exemplary Operating Environment

Figure 1:
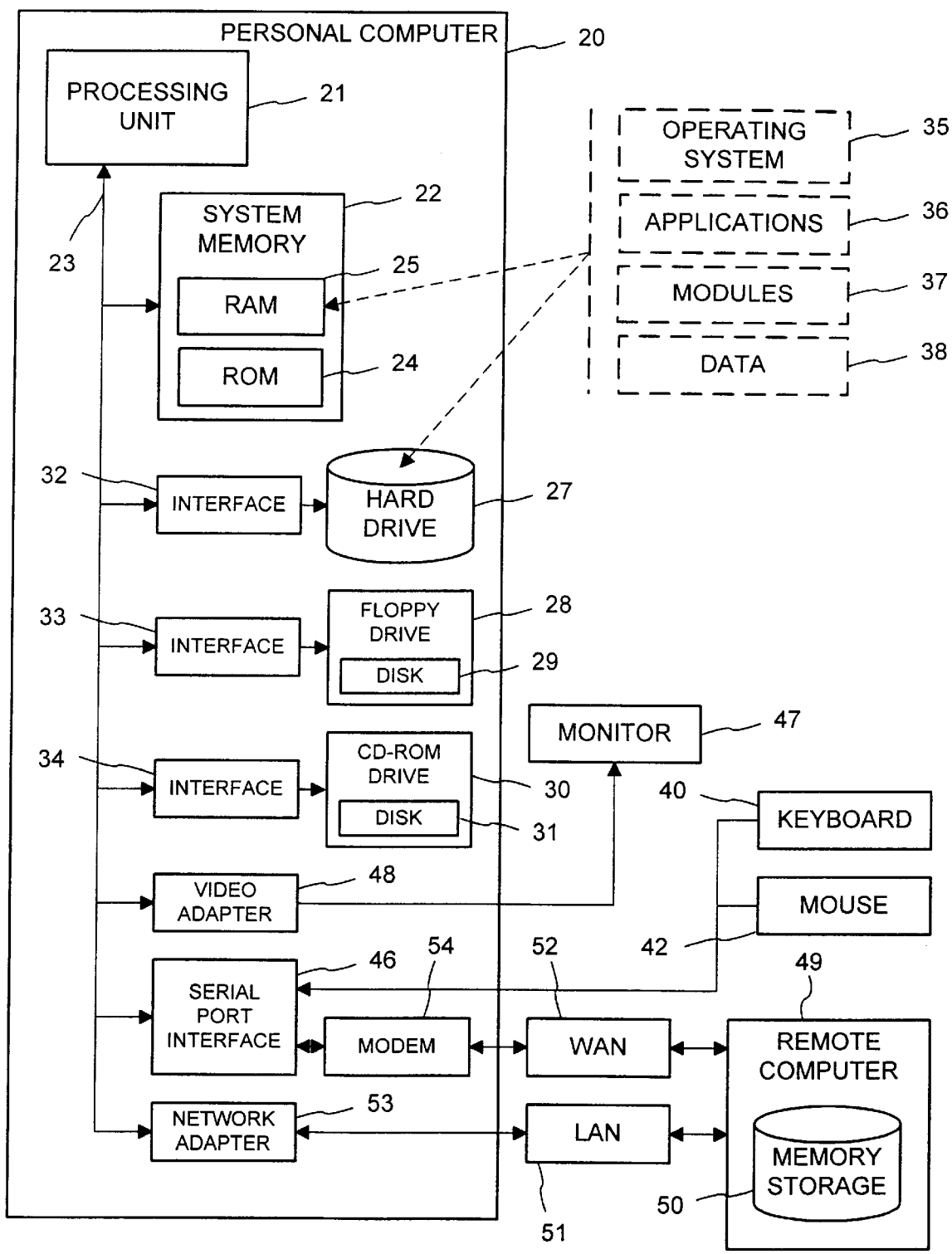
FIG. 1 is a block diagram of a computer system that may be used to implement a method and apparatus embodying the invention for efficiently representing scalar attributes by associating the scalar attributes with wedges.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multiprocessor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Overview of Wedges

Figure 2:
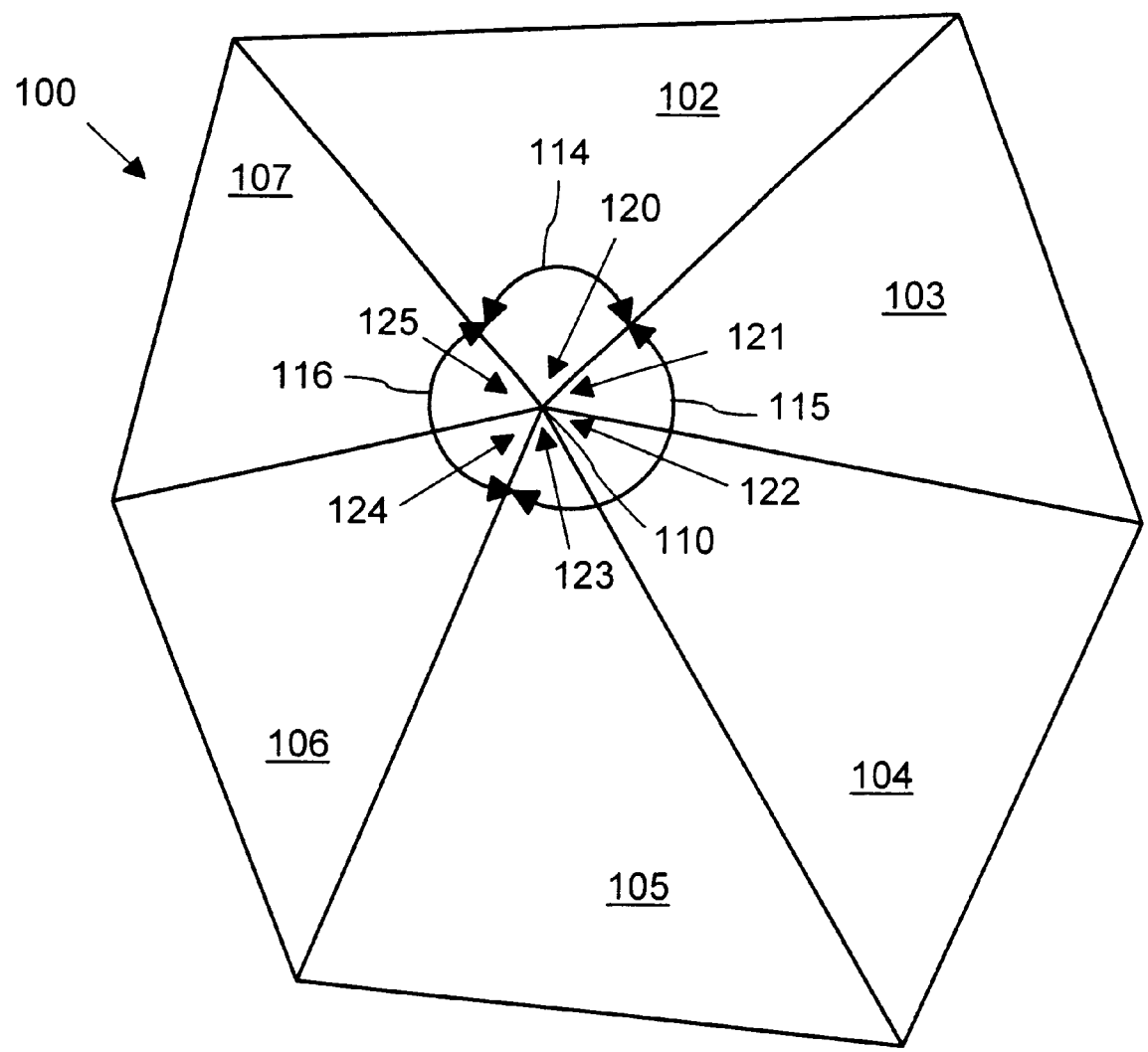
FIG. 2 is a block diagram of a portion of a mesh having scalar attributes associated with wedges.

With reference now to FIG. 2, the computer graphics rendering system provides graphics services to the applications 36 (FIG. 1) for rendering images on the monitor 47 (FIG. 1) based on a mesh data model ("mesh") 100 of a multi-dimensional (e.g., three dimensional) object stored in the system memory 22 (FIG. 1). The illustrated mesh 100 is conceptually a triangle mesh formed of a plurality of vertices (e.g., vertex 110) and triangular faces (e.g., faces 102–107) that define a simplicial complex approximating the surface of the object being modeled. The invention, however, is not limited to triangle meshes, and also can be applied to meshes composed of polygons having any number of sides.

Corners of the mesh 100 are points on a face of the mesh at a vertex, as defined by a (vertex, face) tuple. For example, the faces 102–107 that join at the vertex 120 in the illustrated mesh 100 have corners 120–125, respectively, at the vertex 120.

The mesh 100 also has wedges (such as, the wedges 114–116), which are sets of contiguous, vertex-adjacent corners whose attributes are the same. Thus, each vertex of the mesh is partitioned into a set of one or more wedges, and each wedge contains one or more face corners. In the illustrated mesh 100 for example, there are three wedges 114–116 at the vertex 120. The wedge 114 has a single corner 120, while the wedges 115 and 116 have three corners 121–123 and two corners 124–125, respectively.

Mesh Representation Using Wedges

With reference to FIG. 3, the illustrated mesh 100 is represented in the computer 20 as a mesh representation including the data structures having the form shown by the program listing in FIG. 3. As shown in this program listing, a mesh data structure is defined in the statement "struct Mesh" as containing an array (hereafter "vertices array") of vertex records (defined by the statement "Array<Vertex>vertices"), an array (hereafter "wedges array") of wedge records (defined by the statement "Array<Wedge>wedges"), and an array (hereafter "faces array") of face records (defined by the statement "Array<Face>faces"). The mesh data structure further includes an array (hereafter "materials array") of material records (defined by the statement "Array<Material>materials").

The materials records contain data representing discrete attributes associated with faces of the mesh 100. The particular form of the data is platform dependent, but typically includes colors and texture mapping parameters.

The faces array contains face records (defined by the statement "struct Face") that represent faces 102–107 of the mesh 100. Each face record contains references to three wedge records, references indicating up to three neighboring faces, and a material identifier. The wedge record references specify the wedges to which the corners of the face belong. For example, the face record for the face 102 (FIG. 2) includes a reference to a wedge record for the wedge 114 to which its corner 120 belongs. The references to the neighboring faces specify the adjacent faces. A value of −1 for a neighboring face reference indicates a surface boundary. For example, the neighboring faces references in the face record of the face 102 (FIG. 2) specify the faces 103 and 107, and a surface boundary. The indices (0 . . . 2) of the neighboring faces references (i.e., in the array fnei[3] of FIG. 3) have a correspondence with the indices (0 . . . 2) of the wedge record references (i.e., in the array "wedges[3]" of FIG. 3). In the illustrated face records, the neighboring face reference fnei[i] indicates a face neighbor located opposite or farthest from the wedge indicated by the wedge record reference wedges[i]. These neighboring face references are used in applying vertex split and edge collapse transformations to the mesh, such as during LOD variation of a progressive mesh representation (described below) using the wedge-based mesh representation. The material identifier is an index of a material record in the materials array.

The wedges array contains wedge records (defined by the statement "struct Wedge") that represent wedges 114–116 of the mesh 100. Each wedge record contains a reference to a vertex record, and a wedge attributes data structure. The vertex reference specifies the vertex at which the wedge is located. For example, the wedge records for the wedges 114–116 (FIG. 2) each includes a reference to a vertex record (in the mesh's vertex array) for the vertex 110 (FIG. 2). The wedge attributes data structure (defined by the statement "struct WedgeAttrib") represents scalar attributes associated with the wedge. In the illustrated mesh data structure, these scalar attributes include a $(n_x, n_y, n_z)$ normal vector, and a $(u,v)$ texture coordinate.

The vertex array contains vertex records (defined by the statement "struct vertex") that represent vertices 120 of the mesh 100 (FIG. 2). Each vertex record contains a vertex attribute which specifies geometric properties of the vertex (namely, the (x, y, z) spatial coordinate of the vertex).

Accordingly, in the mesh data structure shown in FIG. 3, the scalar attributes are stored in association with wedges. This has the advantage (as compared to storing scalar attributes in association with corners) of a more compact mesh representation. Scalar attributes that are the same for adjacent corners are stored only once in the illustrated mesh representation. By contrast, since a large number of adjacent corners in a typical mesh have the same scalar attributes, a mesh representation that stores scalar attributes in association with corners would store such scalar attributes multiple times (i.e., in association with each adjacent corner with identical attributes).

Additionally, the storage of the scalar attributes in association with wedges has the advantage that local transformations (e.g., vertex split or edge collapse transformations) can be applied to the mesh without creating gaps or cracks in the mesh surface. By contrast, the vertex replication approach described in the Background and Summary of the Invention section above replicates vertices along creases or discontinuity curves of the mesh, which replicated vertices can be pulled apart (creating a gap or crack) when a local transformation is applied. The illustrated mesh representation with scalar attributes stored in association with wedges therefore can be used in run-time LOD approximation, progressive transmission and like applications that apply localized transformations to a mesh.

The illustrated mesh representation also achieves efficient storage and transmission by linking the data structure records in a single direction. In the illustrated mesh representation, the face records point to wedge records and wedge records point to vertex records. This compactly but fully represents the connectivity between the various mesh elements (e.g., faces, wedges and vertices). However, while it is relatively easy to find the wedges and vertices that pertain to a face, this structure of the illustrated mesh representation makes it considerably more difficult to determine which faces or wedges connect to a particular vertex.

Progressive Mesh Representation Using Wedges

With reference now to FIGS. 4 and 5, the illustrated mesh representation with scalar attributes stored in association with wedges can be applied advantageously to a progressive mesh (PM) representation. As disclosed in the Progressive Meshes Patent Application referenced and incorporated herein above, the PM representation represents a sequence of progressively more detailed meshes as a base mesh $M^0$ and sequence of mesh refinement transformations (e.g., the vertex split transformation 151 in FIG. 6) that applied successively to the base mesh exactly reproduce an arbitrary mesh M. An illustrated PM representation that stores appearance attributes in association with wedges in accordance with the invention includes data structures having the form shown by the program listings in FIGS. 4 and 5.

The illustrated PM representation using wedges (FIG. 4) is defined (by the statement "struct PMesh") to contain a base mesh (as defined by the statement "Mesh base_mesh") having the mesh data structure shown in FIG. 3 and described above that stores scalar appearance attributes in association with wedges. The illustrated PM representation also contains an array (hereafter "vertex split array") of vertex split records (defined by the statement "Array<Vsplit>vsplits"), and integers ("full_nvertices," "full_nwedges", and "full_nfaces") specifying the number of vertices, wedges and faces in the complete arbitrary mesh. These integers are used by a progressive mesh iterator described below to more efficiently pre-allocate memory for arrays before iterating through the sequence of meshes represented by the illustrated PM representation.

Vertex Split Parameters Relative to a Face

The vertex split records (defined by the statement "struct Vsplit" in the program listing of FIG. 5) represent the individual vertex split transformations that produce a sequence of meshes at progressively higher levels of detail from the base mesh $M^0$ up to the arbitrary mesh M. As with the base mesh data structure, the vertex split records also specify scalar attributes of the corners added in the vertex split transformation in association with wedges. In addition, the illustrated vertex split records parameterize the vertex split transformation relative to a face of the mesh, which facilitates updating the affected wedge and face records in the mesh data structure that is singly linked in the direction of the faces array to wedges array to vertices array. Otherwise, if the vertex split transformation were parameterized by the vertices ($v_s$, $v_l$, $v_r$) as in the Progressive Meshes Patent Application referenced above, it is computationally difficult to look up the affected wedge and face records in the wedge and face arrays given only these three vertices.

Figure 6:
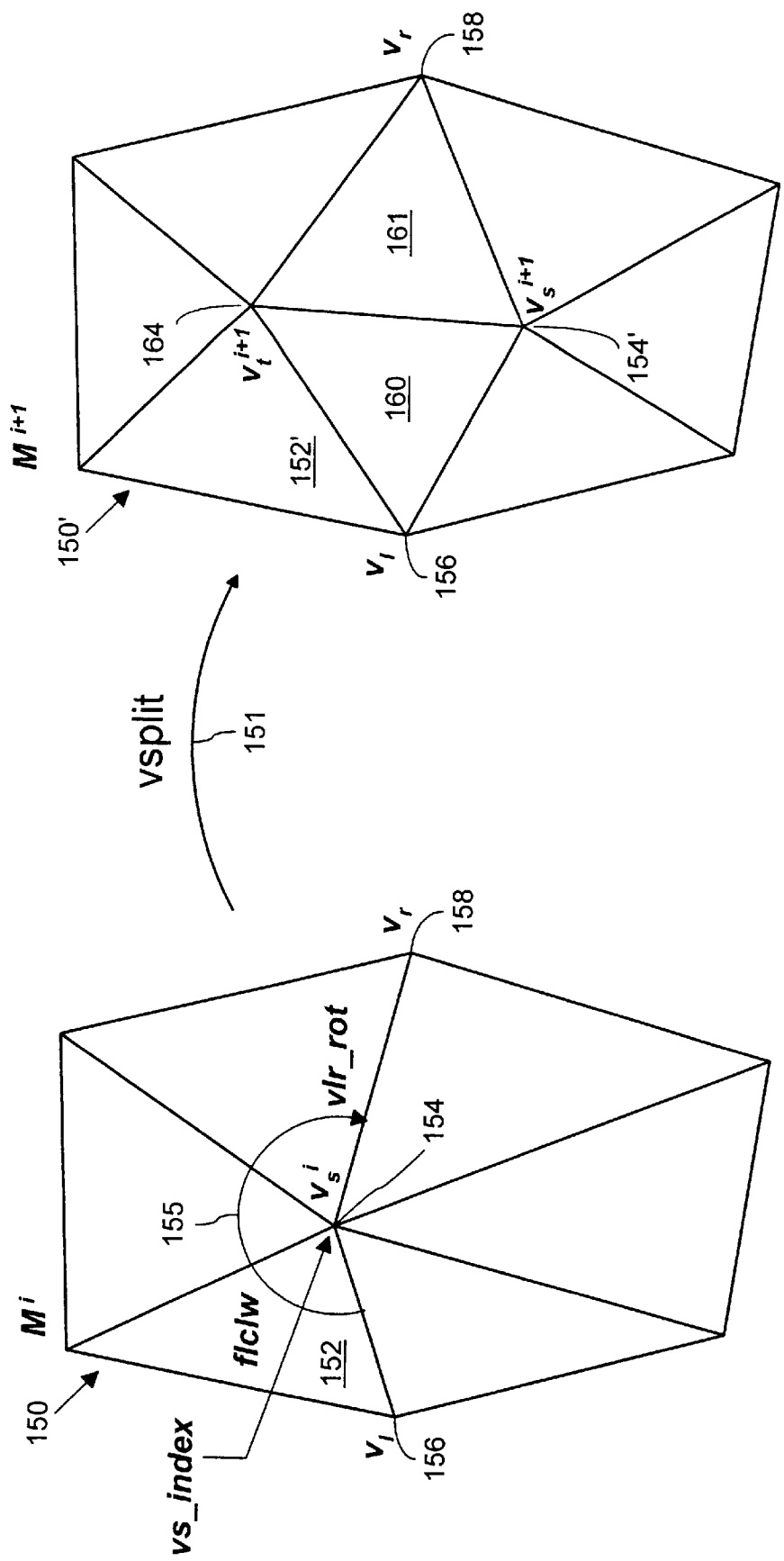
FIG. 6 is a block diagram illustrating a vertex split transformation represented in a vertex split record as a face identifier, split vertex index, and rotation.

With reference in particular to FIG. 6, the vertex split records in the illustrated PM representation parameterize a vertex split transformation 151 from a mesh 150 to a mesh 150' of the progressive mesh sequence by specifying a face 152, a vertex 154 on the face, and a number of clockwise face rotations 155 about the vertex 154. The face 152 is specified in the vertex split record ("struct Vsplit" in FIG. 5) by the index (herein denoted "flclw") of its face record in the faces array of the mesh data structure (as defined in the statement "in flclw" in FIG. 5). The vertex split record specifies the vertex 154 by the index (herein denoted "vs_index") out of the three wedge record references in the "flclw" face record (i.e., the "int wedges[3]" statement in FIG. 3) that indicates the wedge associated to the vertex 154. Since there are only three vertices on a face of a triangle mesh, the index vs_index has the value $0 \leq vs\_index \leq 2$, and is encoded in two bits (as defined in the statement "short vs_index: 2" in FIG. 5). Finally, the vertex split record directly specifies the number of rotations (herein denoted "vlr_rot").

From the two indices, flclw and vs_index, the vertex $v_s^i$ 154 in the mesh 150 is positively identified. The vertex $v_l$ 156 also is identified from these indices as the next vertex in the clockwise direction on the face 152 from the vertex 154. The third vertex $v_r$ 158 in the vertex split transformation is identified from the number of clockwise face rotations vlr_rot about the vertex 154 from the edge between the vertices $v_s^i$ 154 and $v_l$ 156. The neighboring face references in the face records that provide face adjacency information are used to quickly identify the clockwise adjacent face of each rotation about the vertex 154. The face flclw, vertex vs_index, and rotation vlr_rot parameters thus are sufficient to indicate the three vertices ($v_s$, $v_l$, $v_r$) involved in the vertex split transformation, while allowing the face and wedge records affected by the vertex split transformation to be identified by a simple look-up in the face and wedges arrays of the mesh data structure (FIG. 3).

With reference to FIGS. 7–8, two reserved values of the parameter vlr_rot are used to indicate special case vertex split transformations shown in FIGS. 7–8. FIG. 7 illustrates the special case of a vertex split transformation 171 from a mesh $M^i$ 170 to mesh $M^{i+1}$ 170' where the vertex $v_r$ does not exist in the mesh 170. This can occur when the vertex $v_s^i$ 174 is on a surface boundary of the mesh 170. The vertex split record ("struct Vsplit" in FIG. 5) represents this case with a value of zero for the face rotations parameter vlr_rot. The flclw parameter again indicates a face 172 of the mesh 170 on which the vertex $v_l$ 172 is clockwise adjacent to the vertex $v_s^i$ 174. The vertex split transformation 171 then adds a single face 180 in the mesh 170' between the vertices $v_l$ 172, vertex $v_s^{i+1}$ 174', and vertex $v_t^{i+1}$ 184.

FIG. 8 illustrates the special case of a vertex split transformation 191 from a mesh $M^i$ 190 to mesh $M^{i+1}$ 190' where the mesh 190 lacks any face on which the vertex $v_l$ 196 is clockwise adjacent to the vertex $v_s^i$ 194. The vertex split record represents this case with a value of negative one for the vlr_rot parameter. When vlr_rot=−1, the flclw parameter indicates a face 192 of the mesh 190 on which the vertex $v_l$ 192 is counter-clockwise from the vertex $v_s^i$ 194. The vertex split transformation 191 then adds a face 202 between the vertices $v_l$ 192, vertex $v_s^{i+1}$ 194', and vertex $v_t^{i+1}$ 200.

Figure 9:
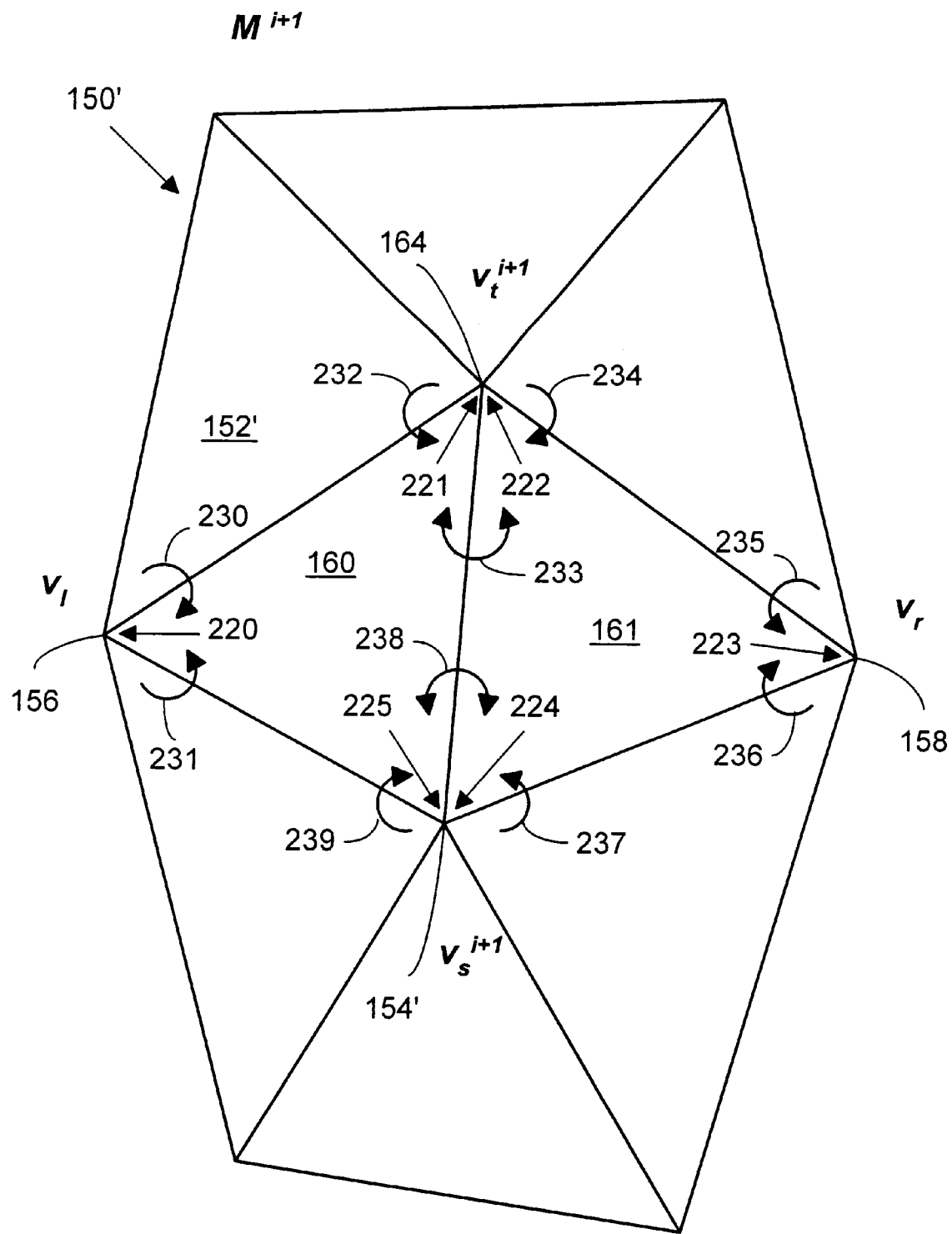
FIG. 9 is a block diagram illustrating corners introduced by a vertex split transformation and representation of corner continuity in the vertex split record.

With reference to FIGS. 5 and 9, the vertex split record ("struct Vsplit" in FIG. 5) also contains a 10-bit "corners"

field (defined by the statement "short corners: 10") that encodes the wedges to which the corners 220–225 of the two faces 160–161 added in the vertex split transformation 151 (FIG. 6) are assigned. Each of the ten bits indicates a corner continuity 230–239, i.e., whether a respective one of the corners 220–225 belongs to the same wedge as one of its adjacent corners. For example, two of the ten bits of the corners field indicate whether the corner 220 is in the same wedge as the adjacent corners to each side (indicated as corner continuities 230–231). If both bits are set to one, then the corner 220 is in a wedge spanning its adjacent corners. If either of the bits are set to zero, then the corner 220 adjoins a discontinuity curve of the mesh $M^{i+1}$ 150'. If both bits are set to zero, then the vertex split transformation added a new wedge to the mesh that contains only the corner 220. Accordingly, the corners field provides sufficient information to determine how many new wedges (from one to six) are introduced by the vertex split transformation, and how the corners are assigned to old and new wedges. One new wedge for the newly introduced vertex $v_t^{i+1}$ 164 is always added in each vertex split transformation.

Figure 10:
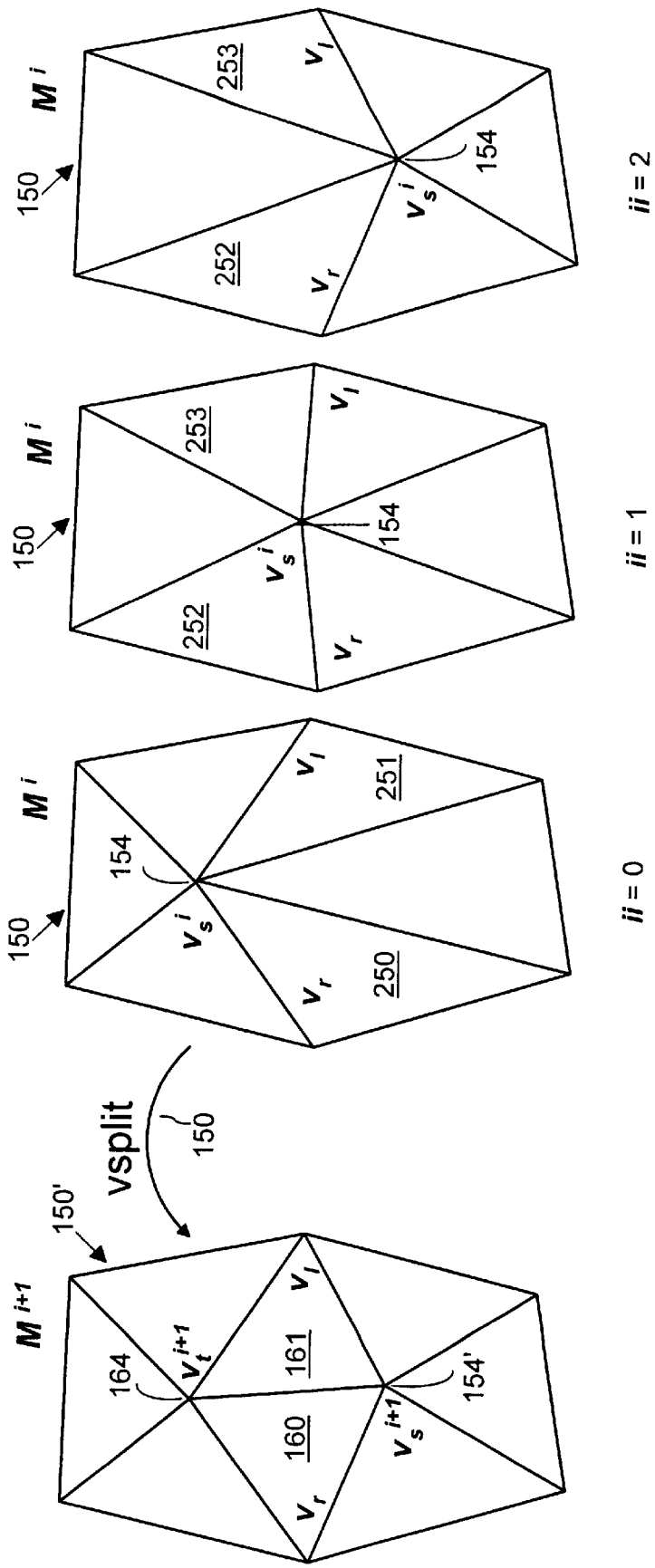
FIG. 10 is a block diagram illustrating a vertex split transformation represented in a vertex split record using geometry prediction to encode vertex positions.

With reference to FIGS. 5 and 10, the vertex split record ("struct Vsplit" in FIG. 5) also contains a 2-bit geometry prediction field (defined by the statement "short ii: 2") and two data members (a large delta vad_l and small delta vad_s defined by the statement "VertexAttribD vad_l, vad_s") that records how the split vertices $v_s^{i+1}$ 154' and $v_t^{i+1}$ 164 are positioned relative to the vertex $v_s^i$ 154. The geometry prediction field indicates the approximate positions of the split vertices $v_s^{i+1}$ 154' and $v_t^{i+1}$ 164 relative to the vertex $v_s^i$ 154 prior to the transformation. More particularly, a geometry prediction value of zero indicates that the split vertex $v_t^{i+1}$ 164 is closer to the vertex $v_s^i$ 154, while a geometry prediction value of two indicates that the split vertex $v_s^{i+1}$ 154' is closer. A geometry prediction value of one indicates that the vertex $v_s^i$ 154 is approximately at a mid-point or average of the split vertices $v_s^{i+1}$ 154' and $v_t^{i+1}$ 164. Accordingly, the positions of the split vertices $v_s^{i+1}$ 154' and $v_t^{i+1}$ 164 are calculated from the geometry prediction field, large delta and small delta as follows:

If ii=0, $v_t^{i+1}:=v_s+vad\_s$; $v_s^{i+1}:=v_s+vad\_l$

If ii=2, $v_t^{i+1}:=v_s+vad\_l$; $v_s^{i+1}:=v_s+vad\_s$

If ii=1, $v_t^{i+1}:=v_s+vad\_s+vad\_l$; $v_s^{i+1}:=v_s+vad\_s-vad\_l$

The vertex split record similarly encodes deltas to wedge attributes in the neighborhood of the split vertices according to the geometry prediction field and the corners continuity field into a wedge attribute deltas array (defined by the statement "Array<WedgeAttrib>wads"). Depending on the number of wedges present in the neighborhood of the split vertices, this array ranges in size from 1 to 6 sets of wedge attribute deltas. For PM representations of typical data models, the average size of the wedge attribute delta arrays is about 1.1 to 1.5. In the illustrated vertex split records, the wedge attribute delta arrays are encoded as set forth in the program listing in Appendix A attached hereto. On decoding a vertex split record, the function ("expected_wad_num") shown in the program listing in Appendix B attached hereto is used to determine the number of wedge attribute delta arrays that are encoded into the vertex split record.

The vertex split record further contains a material prediction field which indicates whether the newly introduced faces 160–161 (FIG. 6) have the same or different material identifiers as an adjacent face present in the mesh 150 prior to the vertex split transformation. In the illustrated PM representation, the material prediction field is a 2-bit length field which is set to indicate the respective face 160–161 has an identical material identifier as an appropriate one of its adjacent faces chosen according to the geometry prediction (ii). More particularly, if the geometry prediction is zero (i.e., ii=0), then the material prediction of the faces 160–161 is based on the adjacent faces 250–251, respectively. If the geometry prediction is one or two (i.e., ii=1 or 2), then the material prediction is instead based on the adjacent faces 252–253, respectively. However, if the appropriate adjacent face per the geometry prediction does not exist (e.g., because the split vertex is on a surface boundary), then the other adjacent face is used. For example, in a case where the geometry prediction is zero but the face 251 does not exist, then the material identifier of the face 161 is instead predicted from the face 253. If the material prediction field indicates that the face 160 or 161 does not have the same material identifier as its appropriate adjacent face 250–253 (i.e., the prediction is incorrect), then the vertex split record further records the material identifier of that face 160 or 161 (as defined by the statements "short fl_matid" and "short fr_matid"). On decoding the vertex split records, the two bits of the material prediction field indicate whether the respective material identifiers (fl_matid and fr_matid) are present in a particular vertex split record.

In the illustrated vertex split record, the split vertex index vs_index, the corners field, the geometry prediction field, and the material prediction field are combined into a 16-bit length bit-field referred to as the "code" field (as defined in the statement "struct {short vs_index:2, short corners:10; short ii:2; short matid_predict:2} code").

Progressive Mesh Traversal

With reference to FIGS. 11 and 12, the illustrated PM representation using wedges is traversed in the graphics rendering system on the computer 20 (FIG. 1) to produce LOD approximations using a PM iterator encapsulated in an object-oriented programming class, PMeshIter (FIG. 12). The PM iterator is a mesh data structure (in the format shown in FIG. 3) that can be rendered by the graphics rendering system using well known techniques for rendering images from data models in the form of triangle meshes. Although the PM representation must be iterated to a specific mesh in the progressive mesh sequence before rendering, the PM representation has the advantage over conventional triangle meshes that in a complex scene, many of the objects modeled as meshes do not require high levels of detail. Thus, the overhead of processing the progressive mesh usually is compensated by being able to more quickly render some or most objects in a scene from less detailed meshes in their respective progressive mesh sequences.

The PM iterator class is based on a PM read stream class, PMeshRStream (FIG. 11) that provides an interface to abstract a source of data in the PM representation data structure format. As shown in the program listing of FIG. 11, the PM read stream class is defined to contain four data members, including a pointer to a PM representation data structure (FIGS. 4 and 5), a pointer to an input data stream, a vertex split index, and a temporary buffer for a vertex split record. This abstraction allows the PM representation using wedges to be used in three different scenarios: (1) reading from a PM representation data structure stored in memory (e.g., the system memory 22 of the computer 20 in FIG. 1); (2) reading from a PM representation data structure received progressively on an input data stream, such as from the networks 51–52 or from the hard drive 27 (FIG. 1); and (3) reading from an input data stream while archiving to a PM representation data structure in the memory.

For example, one beneficial use of the PM representation data structure along with the PM read stream and PM iterator classes is that one of the applications 36 (FIG. 1) can construct a mesh data model of an object to a desired complexity (e.g., 1000 faces) by loading the mesh data model from a PM representation data structure stored on the hard drive 27 (such as through use of the scenario (2) of the PM read stream described above). The choice of complexity can be made by the application at runtime, based on the performance abilities of the computer's graphics system (e.g., video adapter 48 of FIG. 1) or other criteria. For example, if the computer's video adapter lacks hardware 3D graphics acceleration, the application may construct a mesh data structure of only 200 faces from the stored PM representation using the PM iterator. Whereas, if hardware acceleration is detected, the application may construct a mesh data structure of 1000 faces complexity using the PM iterator. Significantly, in the scenario (2), the PM representation structure itself does not occupy the system memory 22 (FIG. 1), but is only used as an input data stream from which the mesh data structure of the desired complexity (which does occupy system memory) is constructed. The application can thereby make efficient use of memory resources and adjust its data models to the video performance capabilities of the system.

The PM iterator class illustrated in FIG. 12 is derived from the mesh data structure of FIG. 3, and contains an instance of the PM read stream class of FIG. 11 which serves as a pointer into a source of the PM representation data. The PM iterator is initialized from the PM read stream by copying the PM representation's base mesh onto itself (in the case of the PM representation being stored in memory 22), or reading the PM representation's base mesh from the input stream of the PM read stream. The PM iterator also can be initialized by duplicating another PM iterator. Once initialized, the PM iterator operates to traverse the sequence of meshes specified by the PM representation. Since the PM iterator also is a mesh data structure, it can be rendered by the graphics rendering system as needed (using well known computer graphics techniques for rendering an image from a triangle mesh).

The PM iterator provides "nex()" and "prev()" member functions for moving through the progressive mesh sequence one vertex split record at a time. The next() function applies the vertex split transformation specified in a next vertex split record (indicated by the vspliti index of the PM read stream) to the current mesh. If the vertex split record is not in memory, the PM iterator reads the vertex split record on demand from the input stream (the "istr" pointer of the PM read stream). The vertex split transformation is applied to the current mesh by appending one vertex (vertex $v_t^{i+1}$ 164) to the vertices array, one to six wedges to the wedges array, and one or two faces 160–161 to the faces array of the mesh data structure as specified in the vertex split record. The iterator further traverses the corners around the newly added vertex $v_t^{i+1}$ 164 (FIG. 6) using the face adjacencies specified in the Face::fnei data (FIG. 3), and possibly updates the face records of those corners to point to wedges associated with the new vertex $v_t^{i+1}$ 164. The iterator updates the face adjacencies (Face::fnei) to reflect the newly introduced faces 160–161. Finally, the iterator updates the vertex and wedge attributes using the deltas stored in the vertex split record.

The prev() function moves backwards through the progressive mesh sequence by applying an edge collapse transformation that is the inverse of the vertex split transformation specified in the previous vertex split record. Since the function requires accessing the vertex split records in reverse, the prev() function is only supported if the PM data source indicated by the PM read stream has an associated memory-resident PM representation data structure (the PM data source is read by the PM read stream from a PM representation data structure in memory, or an input data stream concurrently archived to memory). The vertex split record contains sufficient information to perform both the vertex split transformation and its inverse edge collapse transformation. The characteristic of the vertex split records that makes this possible is that changes to mesh attributes (e.g., vertex positions and appearance attributes) are recorded as deltas, so that updates to the mesh attributes can be applied in both forward and reverse direction.

The iterator applies updates associated with the edge collapse transformation to the current mesh in the reverse order of the vertex split transformation. The iterator updates the vertex and wedge attributes, updates face adjacencies, updates corners around the vertex $v_t$ 164, and then removes one vertex (the vertex $v_t$ 164), one to six wedges, and one to two faces from the ends of the vertices, wedges and faces arrays in the mesh data structure.

The illustrated PM iterator also supports traversal of the progressive mesh sequence to a desired level of complexity with the function "goto()." The desired complexity can be expressed as a number of vertices or number of faces. The goto function traverses the sequence by invoking the next or prev functions an appropriate number of times until the mesh is refined or simplified to the specified complexity.

Additionally, the illustrated PM iterator provides a second function nextA() for traversing the progressive mesh sequence in the forward direction, which is used in constructing a geomorph from the PM representation as described below.

Geomorph Structure Using Wedges

With reference to FIGS. 13–14, the illustrated computer graphics rendering system also supports geomorphs in which scalar appearance attributes are stored in association with wedges. Geomorphs, as discussed in the Progressive Meshes Patent Application referenced above, are structures that can provide a smooth visual transition between any two meshes $M^c$ and $M^f$ in the progressive mesh sequence at different complexities c and f where $0 \leq c < f \leq n$. A geomorph data structure defined by the program listing shown in FIG. 13 is derived from the illustrated mesh data structure using wedges (FIG. 4). The geomorph is essentially a copy of the mesh $M^f$, but whose attributes at vertices and wedges interpolate between their values in $M^f$ and those of the vertex and wedge ancestors in $M^c$ in accordance with an interpolation parameter a ($0 \leq a \leq 1$). The geomorph data structure contains the additional data members (i.e., vertex attribute end states array "vattrib[0 . . . 1]" and wedge attribute end states array "wattribs[0 . . . 1]") that store the end states of the vertex and wedges attributes.

The illustrated geomorph data structure is constructed by providing both a PM iterator initially pointing to the mesh $M^c$ and the complexity (in number of vertices or faces) of the mesh $M^f$. During geomorph construction, the PM iterator is advanced through the PM sequence by invoking the special member function "PMeshIter::nextA()." The nextA function operates similarly to the PMeshIter::next() function, except that it also tracks the ancestral attributes of the vertices and wedges using the ancestry data structure shown in the program listing of FIG. 14. The ancestry data structure contains an array of ancestor vertex attributes and an array of ancestor wedge attributes that store the attributes of each vertex and wedge of the mesh as it is refined to the complexity f. Once the PM iterator has traversed the progressive mesh sequence to the mesh $M^f$, the current vertex and wedge attribtes of PMeshIter::Mesh are copied to the vertex and wedge attribute end state arrays (into vattribs[1] and wattribs[1]), along with the ancestral attributes in the ancestry data structure (into vattribs[0] and wattribs[0]). In the illustrated graphics rendering system, creating the geomorph data structure consumes approximately twice the time as iterating through the progressive mesh sequence between the complexities c and f.

The geomorph structure also provides an evaluate function that takes a floating point number as the interpolation parameter a, and evaluates the geomorph at that value of the interpolation parameter by interpolating the vertex and wedge attributes of the mesh between the end states stored in the vertex and wedge attribute end states arrays. The vertex positions and texture coordinates are linearly interpolated. The normals attributes are interpolated over the unit sphere. In cases where the portion of the mesh's vertices and wedges that require interpolation is small, an alternative geomorph data structure can be used in which a sparse data structure is used in place of the full vertex and wedge attribute end states arrays so as to reduce memory use and speed geomorph evaluation.

Compression

The illustrated mesh data structure (FIG. 3) and PM representation data structure (FIG. 4) have been shown experimentally to provide a concise representation of a mesh. Further reductions in the size of these data structures can be realized so as to reduce consumption of storage and transmission resources.

First, the size of these data structures can be reduced by calculating the normals at the time of rendering the mesh in a graphics image, rather than storing the normals in the data structures (e.g., in association with the wedges). This takes advantage of the fact that the discontinuities in the normal field are more significant to the appearance of the mesh, than the precise normal at each point on the mesh. In the mesh and PM representation data structures according to the invention, the wedges information in the data structures indicates the presence of creases (i.e., discontinuity curves on the mesh surface). It is therefore possible to retain much of the mesh's appearance without storing normals by calculating the normals based on the wedges information. More specifically, in this alternative implementation, the normal for each wedge is calculated as a weighted function of the geometric normals (i.e., perpendicular unit vector) to the faces to which the wedge belongs. With reference to FIG. 2 for example, the normal attribute of the wedge 114 (which has a single face 102) is calculated as the geometric normal of the face 102. The normal attribute of the wedge 115 (which encompasses three faces 103–105) is calculated as a weighted function of the geometric normals to the faces 103–105. The normal attribute of the wedge 116 (which has two faces 106–107) is calculated as a weighted function of the geometric normals to the faces 106–107. The weighted function can be a simple average of the geometric normals to the faces, or can be a function that gives greater weight to a centrally positioned face in the wedge (e.g., the face 104 of the wedge 115 which is positioned between the faces 103–105), or other function.

A second modification to the PM representation data structure achieves a size reduction by applying an arithmetic encoding to the code field of the vertex split records (which comprises the corner continuities, geometry prediction and material identifier prediction for the vertex split transformation). Arithmetic encoding is a well known compression technique using variable length codes which achieves compression by assigning shorter codes to raw data values that occur most frequently in the sample and longer codes to less frequent raw data values. The corner continuities, geometry prediction and material identifier of the vertex split transformation usually are highly correlated for a given mesh. In other words, the same values of the code field will recur in many of the vertex split records of the PM representation data structure. The vertex split records' code field is arithmetically encoded by constructing an arithmetic encoding code table based on the statistical frequencies of occurrence of the particular values of the code field in the PM representation data structure, then substituting the variable length arithmetic codes for the code field in the vertex split records. Alternatively, the entire code field (including the vertex index portion) or only the corner continuities, geometry prediction and material identifier prediction portion (omitting the vertex index portion) of the code field ("Vsplit.code" in FIG. 5) can be arithmetically encoded.

According to a third modification, the PM representation data structure using wedges can be further compressed by delta encoding the face index ("flclw") in the vertex split records as a difference from the face index in the immediately preceding vertex split record in sequence, and reordering the sequence of the vertex split records so as to minimize the delta between face indices of successive vertex split records. This reordering can have the effect of deteriorating the appearance of some of the intermediate meshes (for example, because the vertex split transformation applied to that point may not be uniformly distributed over the mesh). However, this approach is useful in applications where minimizing the size of the PM representation data structure is the primary goal.

When reordering the vertex split records, the relationship between dependent vertex split records in the sequence also must be maintained. More particularly, certain vertex split records represent vertex split transformations that are applied to a portion of the mesh structure resulting from a prior vertex split transformation. The later vertex split transformation in this instance is said to have a dependency on the prior vertex split transformation in the sequence. According to one definition of the dependency, where $0 \leq j < i < n$, a later vertex split transformation ($vsplit_i$) with split vertex ($v_s^i$) depends on a prior vertex split transformation ($vsplit_j$) that introduces two faces ($f_l^j$ and $f_r^j$), if either face $f_l^j$ or $f_r^j$ is adjacent to vertex $v_s^i$ in the mesh $M^i$ to which the vertex split transformation $vsplit_i$ is applied. In other words, the vertex split transformation $vsplit_i$ depends on an earlier vertex split transformation $vsplit_j$ if the earlier vertex split transformation $vsplit_j$ introduces any face which the later vertex split transformation $vsplit_i$ expects in its neighborhood. Alternatively, a less strict definition of dependencies as described in my U.S. patent application Ser. No. 08/826,570, filed Apr. 3, 1997, entitled "View-Dependent Refinement of Progressive Meshes" (the disclosure of which is incorporated herein by reference) can be used.

With reference to FIG. 15, a process 260 is applied to a PM representation data structure of the format shown in FIG. 4 for encoding the vertex split records with minimal face index deltas. The process 260 begins at a step 261 by constructing a dependency graph (using well known techniques and data structures for directed acyclic graphs) that represents the dependencies of the vertex split transformations on preceding vertex split transformations in the sequence. The dependencies can be identified by traversing the PM sequence using the PM iterator (described above) and recording which vertex split record adds each face or alters the position of a vertex of the mesh, and then adding dependencies to the dependency graph for each vertex split record that specifies a face or vertex that was added or altered by a previous vertex split record.

The process next (step 262) constructs a list sorted by specified face index of all vertex split records in the dependency graph that have no dependencies on another vertex split record. The sorted list can be a balanced binary tree in which the vertex split records are sorted in increasing order of their specified face indices (flclw). The candidate list thus forms a pool of candidate vertex split records from which vertex split records can be drawn to produce the reordered progressive mesh without violating dependencies between vertex split records.

The process 260 then iteratively adds vertex split records from the candidate list to form a reordered vertex split record sequence in steps 263–269. In each iteration, the process 260 at a step 264 selects the vertex split record out of the candidate list that specifies a next higher (in circular sorted order) face index (flclw). At step 265, the process 260 encodes the vertex split record's face index member (Vsplit.flclw) as a delta or difference from the face index specified in the immediately preceding vertex split record in the sequence. The process 260 stores the delta as modulo the current number of faces in the mesh, so that the delta is always positive and wraps around the ends of the array indices. In the first iteration of the steps 263–269, the process 260 simply takes the preceding face index to be zero (or other deterministically chosen number). The process 260 at step 266 appends the selected vertex split record to the reordered vertex split record sequence.

At step 267 in the iteration, the process 260 updates the dependency graph by removing the selected vertex split record along with any dependencies of other vertex split records on the selected vertex split record. This may result in additional vertex split records that are now free of any dependencies on any other vertex split records not already in the reordered sequence. The process 260 adds these new non-dependent vertex split records to the candidate list according to the sorted order.

The process 260 continues iterating through the steps 263–269 until all vertex split records are added to the reordered sequence.

At each iteration, the ratio of candidate vertex splits to the size of the mesh thus far reconstructed (i.e., the mesh formed by applying the vertex split records in the reordered sequence at that point to the base mesh) is roughly constant. As a result, the size of the encoded face index deltas is independent of the size of the mesh M. The face index deltas thus can be encoded in approximately 7-bits.

Finally, in accordance with a fourth modification, the material identifiers that are encoded in the fl_matid and fr_matid fields of the illustrated vertex split records (FIG. 5) can instead be stored separate from the vertex split records as a compacted "mispredicted material identifiers" array (e.g., "Array<short>mispredicted_matids") added to the PM representation data structure (FIG. 4). An index (e.g., "int mispredicted_matidi") into this new array also is added to the PM read stream class (FIG. 11). During traversal of the PM representation data structure using the PM iterator, the next() and prev() functions of the PM iterator respectively increment and decrement this index per the number of incorrect material predictions (i.e., 0, 1 or 2) indicated by the material prediction field of the current vertex split record.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. In a computer, a method of efficiently representing scalar appearance attributes in a mesh data model of a multi-dimensional object for use in rendering graphics images, the method comprising the steps of:

grouping sets of contiguous, adjacent corners at vertices of a conceptual mesh that share identical scalar appearance attributes into wedges;

specifying a plurality of wedge records to represent the wedges in the mesh data model; and specifying scalar appearance attributes in association with the wedge records in the mesh data model.

2. The method of claim 1 wherein the mesh data model is a progressive mesh data model containing a base mesh data model and a sequence of refinement records to represent mesh refinement transformations that applied to the base mesh data model produce a sequence of progressively more detailed mesh data models of the multi-dimensional object, the method further comprising the steps of:

specifying wedge record updates in the refinement records to represent wedges that are altered or added in the mesh refinement transformation of the respective refinement record; and specifying scalar appearance attributes to be associated with the updated wedge records in the refinement records.

3. The method of claim 2 wherein the step of specifying the wedge record updates comprises the step of:

specifying continuity in scalar appearance attributes of each corner of a face introduced to the mesh data model in the vertex split transformation with its neighboring corners.

4. A computer-readable data storage medium having encoded thereon a mesh data model representative of a multi-dimensional object for use in rendering graphics images of the object, the mesh data model comprising:

a plurality of vertex elements containing data defining vertices of a mesh approximating the object;

a plurality of face elements containing data defining faces of the mesh; and a plurality of wedge elements containing data defining sets of contiguous, vertex-adjacent corners of the mesh having identical scalar appearance attributes.

5. The computer-readable data storage medium of claim 4 wherein the mesh data model further comprises scalar appearance attributes stored in association with the wedge elements.

6. The computer-readable data storage medium of claim 4 wherein the face elements are singly linked to the wedge elements, and the wedges elements are singly linked to the vertex elements.

7. The computer-readable data storage medium of claim 4 wherein the mesh data model is a progressive mesh data model further comprising a sequence of refinement elements defining mesh refinement transformations that produce a sequence of progressively more refined meshes when applied successively to the mesh.

8. The computer-readable data storage medium of claim 7 wherein at least one of the refinement elements comprises:
   a face datum identifying a face on the mesh;
   a vertex datum identifying a vertex on the face; and
   a rotation datum identifying a number of face rotations about the vertex, where the face datum, the vertex datum and the rotation datum specify a vertex split transformation.

9. The computer-readable data storage medium of claim 8 wherein the at least one refinement element further comprises:
   a corner continuity field having a plurality of bits that specify whether each of a plurality of corners introduced in the vertex split transformation have scalar appearance attributes identical to an adjacent corner.

10. The computer-readable data storage medium of claim 8 wherein the at least one refinement element further comprises:
    a geometry prediction datum defining a predicted geometry of a portion of the mesh resulting from the vertex split transformation; and
    a material prediction datum defining a predicted discrete appearance attribute of one or two faces introduced by the vertex split transformation.

11. The computer-readable data storage medium of claim 8 wherein the at least one refinement element further comprises:
    a corner continuity field having a plurality of bits that specify whether each of a plurality of corners introduced in the vertex split transformation have scalar appearance attributes identical to an adjacent corner;
    a geometry prediction datum defining a predicted geometry of a portion of the mesh resulting from the vertex split transformation; and
    a material prediction datum defining a predicted discrete appearance attribute of one or two faces introduced by the vertex split transformation;
    wherein the corner continuity field, the geometry prediction datum and the material prediction datum in the at least one refinement element is encoded using a single arithmetic encoding table.

12. A computer graphics rendering system comprising:
    a mesh data store for storing a progressive mesh data model of a multi-dimensional object, the progressive mesh data model having a base mesh data structure and a sequence of vertex split records, the base mesh data structure comprised of a plurality of face records, a plurality of wedge records, and a plurality of vertex records, where the face records contain references to wedge records and the wedge records contain references to vertex records, the base mesh data structure storing scalar appearance attributes in association with the wedge records; and
    an iterator for traversing the progressive mesh sequence to produce a mesh data model at a desired level of detail by applying or reversing vertex split transformations specified by the vertex split records to the mesh data model beginning with the base mesh data structure.

13. The computer graphics rendering system of claim 12 wherein the vertex split records comprise data specifying a face of the mesh data model, a vertex on the face, and a number of rotations about the vertex which together define a set of vertices ($v_s$, $v_l$, and $v_r$) of the mesh data model that parameterize the vertex split transformation.

14. The computer graphics rendering system of claim 12 wherein the vertex split records comprise data specifying continuity in scalar appearance attributes of each corner of a face introduced in the vertex split transformation with its neighboring corners.

15. In a computer, a method of efficiently representing scalar appearance attributes in a mesh data model of a multi-dimensional object for use in rendering graphics images, the method comprising the steps of:
    encoding wedges information into the mesh data model that specifies groupings of contiguous, vertex adjacent corners having identical scalar appearance attributes on a conceptual mesh into wedges;
    storing the mesh data model with the encoded wedges information in a computer memory; and
    upon rendering a graphics image of a scene containing the multi-dimensional object from the mesh data model, shading faces of the mesh in the graphics image using normals calculated as a function of geometric normals to corners in the wedges.

16. The method of claim 15 wherein the calculated normals are averages of the geometric normals to corners in the wedges.

17. The method of claim 15 wherein the function is a weighted average of the geometric normals to corners in the wedges.

18. The method of claim 15 further comprising:
    calculating a normal out of the calculated normals as a weighted function of the geometric normals to the corners grouped in one of the wedges specified by the encoded wedges information, where the weighted function more greatly weights a geometric normal of a centrally located corner of the wedge.

19. A method of efficiently representing a progressive mesh in a computer, the method comprising:
    forming a progressive mesh data structure comprising a base mesh data structure and a sequence of refinement records, the base mesh data structure representing a multi-dimensional object at a low level of detail as a mesh having an ordered collection of faces, the refinement records representing refinement transformations specified relative to a face on the mesh that applied successively to the mesh represent the object at progressively higher levels of detail;
    reordering the sequence of refinement records so that each successive refinement record specifies a face that has a least difference in the ordered collection of faces from that specified by an immediately preceding refinement record in the sequence; and
    encoding the refinement records in the sequence to specify their respective face as the difference in the ordered collection of faces from that specified by an immediately preceding refinement record of the sequence.

20. The method of claim 19 wherein the reordering step comprises:
    constructing a dependency graph representing interdependencies between the refinement records that the refinement transformation represented in a refinement record must be preceded by that represented in another refinement record;

constructing a candidate list of the refinement records in the dependency graph that have no dependencies on another refinement record;

iteratively repeating the following steps of:

selecting a refinement record from the candidate list that has a least difference in the ordered collection of faces from that specified by an end refinement record in a reordered sequence;

encoding the selected refinement record to specify its face as the difference in the ordered collection of faces from that specified by the end refinement record in a reordered sequence;

appending the selected refinement record to the reordered sequence;

removing dependencies represented in the dependency graph on the selected refinement record; and updating the candidate list to add any refinement records no longer having dependencies represented in the dependency graph on another refinement record.

21. The method of claim 19 wherein the encoded refinement record specifies the difference modulo the number of faces in the mesh formed by applying the refinement transformations represented in all preceding refinement records in the sequence.

22. The method of claim 19 wherein the least difference is a least difference in ascending order of the faces in the ordered collection of faces, and wraps at an end of the ordered collection.

* * * * *